(12) United States Patent
Sato et al.

(10) Patent No.: US 10,010,467 B2
(45) Date of Patent: Jul. 3, 2018

(54) LOAD DETECTOR AND LOAD DETECTION SYSTEM

(71) Applicant: MINEBEA MITSUMI Inc., Nagano (JP)

(72) Inventors: Kunihiko Sato, Fujisawa (JP); Jun Hatcho, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/835,685

(22) Filed: Dec. 8, 2017

(65) Prior Publication Data
US 2018/0098900 A1    Apr. 12, 2018

Related U.S. Application Data

(63) Continuation of application No. PCT/JP2016/002779, filed on Jun. 8, 2016.

(30) Foreign Application Priority Data

Jun. 12, 2015   (JP) .................................. 2015-119368
Mar. 2, 2016    (JP) .................................. 2016-040340

(51) Int. Cl.
*A61G 7/05*     (2006.01)
*G01G 3/14*     (2006.01)
(Continued)

(52) U.S. Cl.
CPC ......... *A61G 7/0527* (2016.11); *G01G 3/1412* (2013.01); *G01G 19/445* (2013.01);
(Continued)

(58) Field of Classification Search
CPC .. A61G 7/0527; G01G 3/1412; G01G 19/445; G01G 21/28; G01G 23/012; G01G 19/02; G01G 19/52; G01G 21/18
(Continued)

(56) References Cited

U.S. PATENT DOCUMENTS 4,558,757 A  *  12/1985  Mori .................... G06F 3/0414
                                                    177/199
4,632,198 A  *  12/1986  Uchimura ............. G01G 21/24
                                                    177/211
(Continued)

FOREIGN PATENT DOCUMENTS

JP    2006-058035 A    3/2006
JP     4829020 B2     11/2011

OTHER PUBLICATIONS

International Search Report for corresponding International Application No. PCT/JP2016/002779 dated Sep. 22, 2016.
(Continued)

*Primary Examiner* — Randy Gibson
(74) *Attorney, Agent, or Firm* — Pearne & Gordon LLP

(57) ABSTRACT

The load detector includes: first and second beam type load cells which are supported on first and second support bases in a cantilever manner to have free ends; and a mounting part on which an object is to be placed, which includes first and second connection parts connected to the first and second beam type load cells, and which is disposed between the first and second beam type load cells. The free ends of the first and second beam type load cells face opposite directions to each other in an extending direction of the first beam type load cell. The first and second connection parts of the mounting part are respectively connected to the first and second beam type load cells on a side of the free ends of the first and second beam type load cells.

13 Claims, 10 Drawing Sheets

(51) Int. Cl.
*G01G 19/44* (2006.01)
*G01G 21/18* (2006.01)
*G01G 21/28* (2006.01)
*G01G 19/52* (2006.01)
*G01G 23/01* (2006.01)
G01G 19/02 (2006.01)

(52) U.S. Cl.
CPC ........... *G01G 21/28* (2013.01); *G01G 23/012* (2013.01); *G01G 19/02* (2013.01); *G01G 19/52* (2013.01); *G01G 21/18* (2013.01)

(58) Field of Classification Search
USPC .................................................. 177/199, 200
See application file for complete search history.

(56) References Cited

U.S. PATENT DOCUMENTS

| | | | | |
|---|---|---|---|---|
| 4,711,314 A | * | 12/1987 | Suzuki | G01G 21/00 |
| | | | | 177/164 |
| 5,086,856 A | | 2/1992 | Haggstrom | |
| 5,367,129 A | * | 11/1994 | Lahl, Jr. | A63B 47/008 |
| | | | | 177/229 |
| 5,646,375 A | * | 7/1997 | Neuman | G01G 3/1412 |
| | | | | 177/229 |
| 2015/0122555 A1 | | 5/2015 | Meeks et al. | |

OTHER PUBLICATIONS

Written Opinion for corresponding International Application No. PCT/JP2016/002779 dated Sep. 22, 2016.

* cited by examiner

LOAD DETECTOR AND LOAD DETECTION SYSTEM

CROSS-REFERENCE TO RELATED APPLICATIONS

This application is a Continuation Application of International Application No. PCT/JP2016/002779 claiming the conventional priority of Japanese patent Application No. 2015-119368 filed on Jun. 12, 2015 and Japanese patent Application No. 2016-040340 filed on Mar. 2, 2016, and titled "LOAD DETECTOR AND LOAD DETECTION SYSTEM". The disclosures of Japanese patent Applications No. 2015-119368 and No. 2016-040340, and International Application No. PCT/JP2016/002779 are incorporated herein by reference in their entirety.

BACKGROUND

The present disclosure relates to a load detector including beam type load cells and a load detection system including the load detector.

There is known present-on-bed detection in which a load applied to a bed in hospitals, nursing homes, and the like is detected to determine whether a patient or an assisted-living resident is present on the bed. The detection of the load can be performed by disposing load detectors at various positions, and Japanese Patent No. 4829020 discloses, as its example, a load detector to be arranged under each support leg supporting a bed.

SUMMARY

The load detector related to Japanese Patent No. 4829020 includes a cantilever (a beam type load cell) to which strain gages are attached, and a mounting plate supporting a caster attached to the support leg of the bed, the mounting plate being fixed to an end (free end) of the cantilever. In this load detector, the caster may be placed on the mounting plate at various positions.

In the load detector as disclosed in Japanese Patent No. 4829020 in which the mounting plate is fixed to the beam type load cell, the load of an object to be measured (measurement target) is transmitted to the beam type load cell via the mounting plate. Thus, a detection value of load of the measurement target varies depends on the position on the mounting plate at which the measurement target has been placed. This may cause a detection error referred to as a position deviation error.

An object of the present disclosure is to provide a load detector which solves the above problem and successfully detects a load while reducing the influence of a position deviation error, and a load detection system including the load detector.

According to a first aspect of the present disclosure, there is provided a load detector, including:
 a first beam type load cell which is supported on a first support base in a cantilever manner to have a free end;
 a second beam type load cell which is disposed to face the first beam type load cell and which is supported on a second support base in a cantilever manner to have a free end; and
 a mounting part on which an object is to be placed, which includes a first connection part connected to the first beam type load cell and a second connection part connected to the second beam type load cell, and which is disposed between the first beam type load cell and the second beam type load cell,
 wherein the free end of the first beam type load cell and the free end of the second beam type load cell face opposite directions to each other in an extending direction of the first beam type load cell, and
 the first connection part of the mounting part is connected to the first beam type load cell on a side of the free end of the first beam type load cell and the second connection part of the mounting part is connected to the second beam type load cell on a side of the free end of the second beam type load cell.

According to a second aspect of the present disclosure, there is provided a load detection system configured to detect a load of a human subject on a bed, the system including:
 a plurality of load detectors each of which is the load detector as defined in the first aspect, each of the plurality of load detectors being disposed in each of the legs of the bed; and
 a controller connected to the plurality of load detectors and configured to calculate the load of the human subject based on output of the plurality of load detectors.

EMBODIMENTS

<First Embodiment>

An explanation will be made about a first embodiment of the present disclosure with reference to FIGS. 1 to 6.

Figure 1:
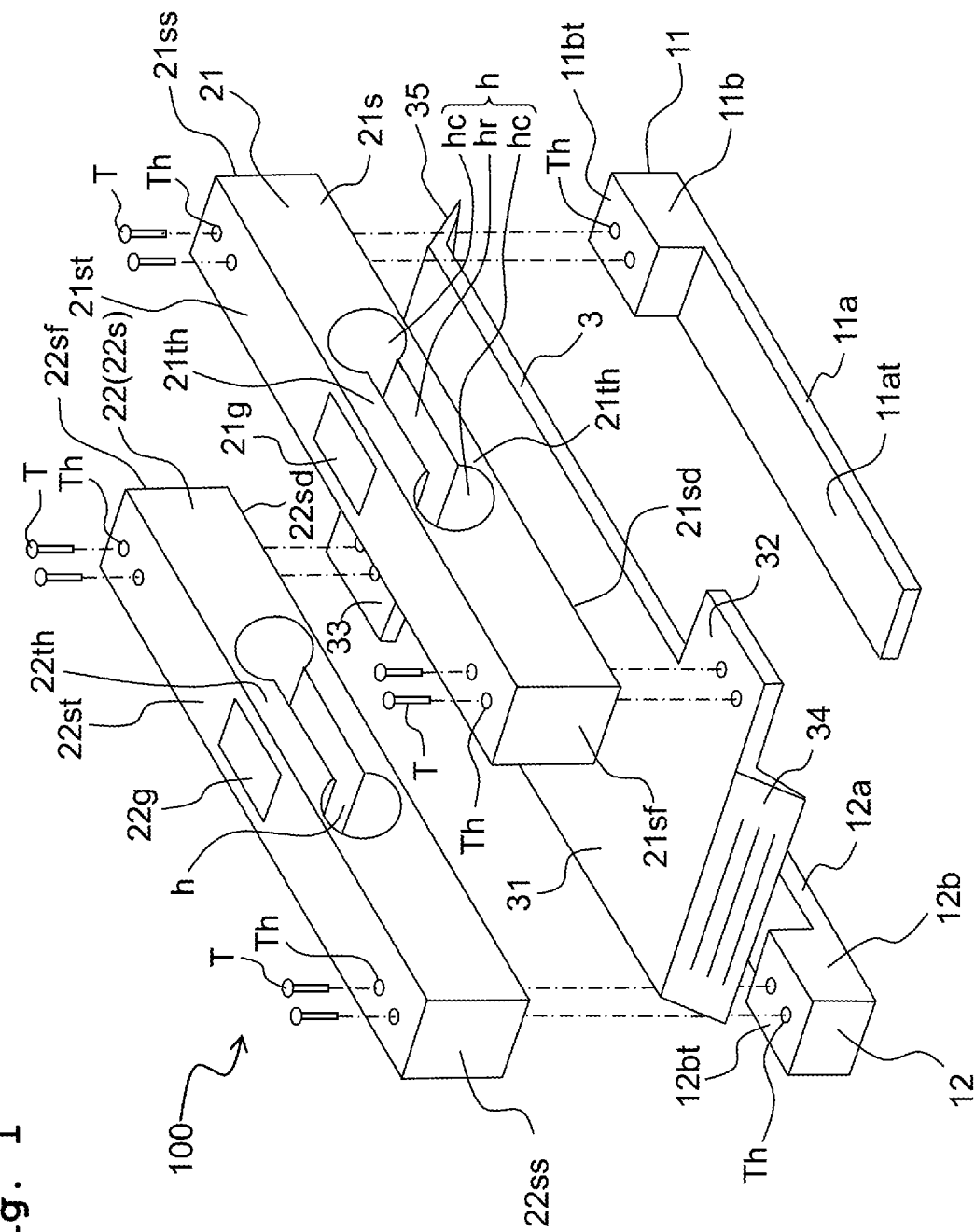
FIG. 1 is an exploded perspective view of a load detector related to a first embodiment of the present disclosure.
Figure 2:
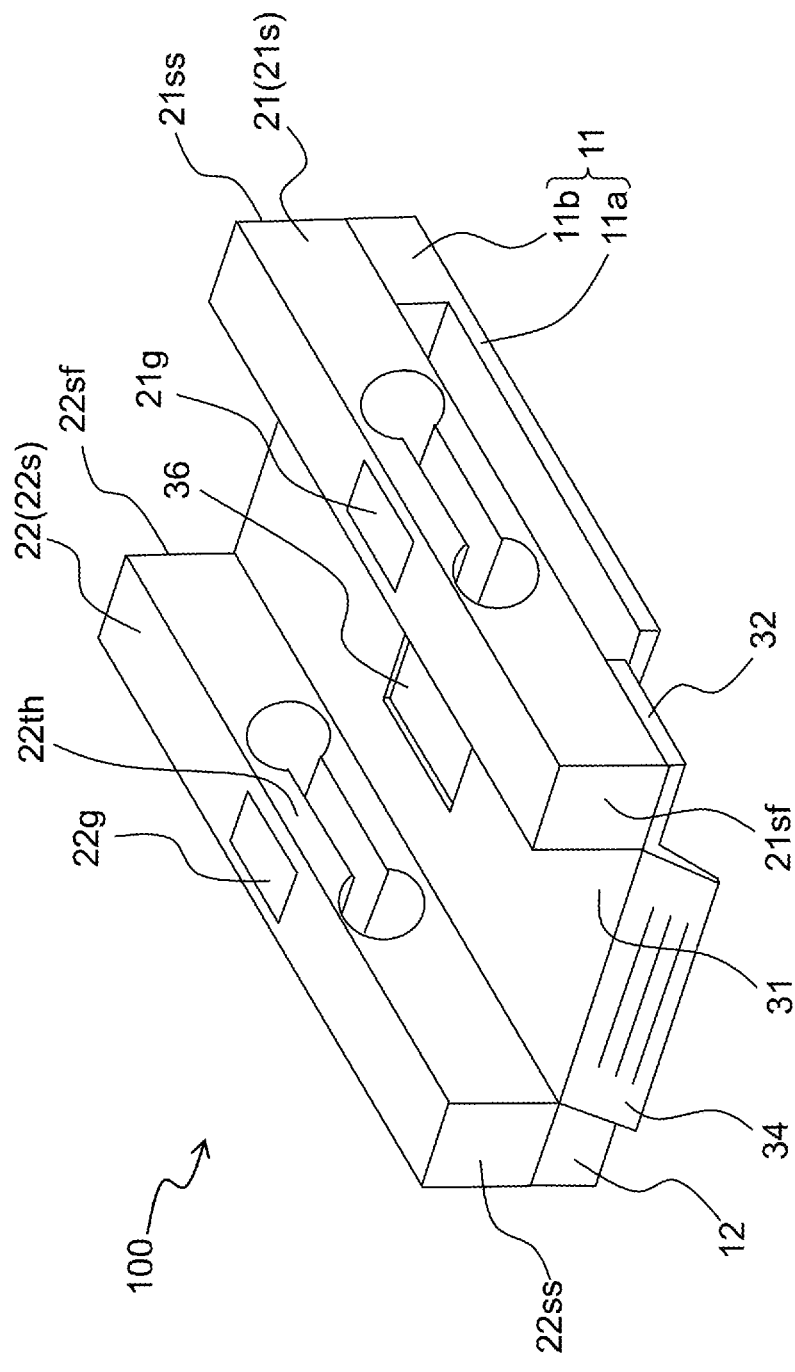
FIG. 2 is a perspective view of the load detector related to the first embodiment of the present disclosure.

As depicted in FIGS. 1 and 2, a load detector 100 related to the first embodiment mainly includes a first base 11, a second base 12, a first load cell 21 which is beam type and which is connected to the first base 11, a second load cell 22 which is beam type and which is connected to the second base 12, and a mounting plate (mounting part) 3 which is supported by the first and second load cells 21, 22 to be positioned therebetween. In the following, a direction in which beams of the first and second load cells 21, 22 extend is defined as a longitudinal direction.

The first base 11 is disposed on a floor to support the first load cell 21 in a cantilever manner. The first base 11 includes a flat plate 11a, of which planar shape is a rectangle almost identical to the planer shape of the first load cell 21, and a support base part 11b which extends from an end of the flat plate 11a in the longitudinal direction and protrudes upward. A top surface 11bt of the support base part 11b is positioned above a top surface 11at of the flat plate 11a.

The top surface 11bt of the support base part 11b includes two screw holes Th. The first load cell 21 is fixed to the support base part 11b via screws T and the screw holes Th.

The second base 12, which has the same shape as the first base 11, includes a flat plate 12a and a support base part 12b. The second base 12 is disposed to face the first base 11 (to be parallel to the first base 11 in this embodiment) with a predetermined distance intervening therebetween, and the support base part 11b of the first base 11 is positioned such that the support base part 11b is on a side opposite to a side on which the support base part 12b is positioned. Namely, the support base part 11b is connected to the flat plate 11a of the first base 11 on a side opposite to the side on which the support base part 12b is connected to the flat plate 12a of the second base 12, in the longitudinal direction. The second load cell 22 is fixed to the support base part 12b via screws T and screw holes Th formed in the top surface 12bt of the support base part 12b.

The first load cell 21, which is a beam type load cell, includes a flexure element (strain body) 21s which has a rectangular column shape and which has a through hole h, and a strain gage 21g attached on the flexure element 21s. The first load cell 21 detects the strain or distortion generated in the flexure element 21s as the change in a resistance value of the strain gage 21g. The load applied to the first load cell 21 is detected, accordingly.

The flexure element 21s is a long square pillar made of metal such as aluminum and iron. The through hole h, which penetrates the flexure element 21s in a width direction, is formed in a center part of the flexure element 21s in the longitudinal direction. The through hole h includes two circular holes hc and a rectangular hole hr. The circular holes hc each has a circular cross-sectional shape, and the rectangular hole hr, which has a substantially rectangular cross-sectional shape, connects the two circular holes hc to each other in the longitudinal direction. Parts, of the flexure element 21s, positioned on the upper and lower sides of the through hole h are thin parts 21th which are thinner in an up-down direction due to existence of the through hole h.

Two screw holes Th penetrating the flexure element 21s in the up-down direction are formed in the vicinity of a first end 21ss of the flexure element 21s. The first end 21ss of the flexure element 21s is fixed to the support base part 11b of the first base 11 via screws T and the screw holes Th. This allows the flexure element 21s to be supported by the first base 11 (support base part 11b) in a cantilever manner with the first end 21ss being a fixed end, the second end 21sf being a free end.

Further, two screw holes Th penetrating the flexure element 21s in the up-down direction are formed in the vicinity of the second end 21sf of the flexure element 21s. The mounting plate 3 as described later is fixed to a lower surface 21sd of the flexure element 21s in the vicinity of the second end 21sf via the screws T and the screw holes Th. Namely, the flexure element 21s (first load cell 21) supports the mounting plate 3, such that the mounting plate 3 is movable in the up-down direction, in the vicinity of the second end 21sf as the free end.

Two strain gages 21g are attached to the thin parts 21th of the flexure element 21s. Specifically, one of the two strain gages 21g is attached to an upper surface 21st of the flexure element 21s and the other of the two strain gages 21g is attached to an lower surface 21sd of the flexure element 21s, at a substantially center part in the longitudinal direction of the flexure element 21s. The strain gages 21g are connected to an external controller via unillustrated lead wires.

The second load cell 22, which has the same structure as the first load cell 21, includes a flexure element 22s which has a rectangular column-shape and two strain gages 22g. The flexure element 22s includes a through hole h penetrating a center part of the flexure element 22s in the width direction. Each of the strain gages 22g is attached to each of thin parts 22th of the flexure element 22s. The second load cell 22 is disposed to face the first load cell 21 (to be parallel to the first load cell 21 in this embodiment) with a predetermined distance intervening therebetween.

Two screw holes Th penetrating the flexure element 22s in the up-down direction are formed in the vicinity of a first end 22ss of the flexure element 22s. The first end 22ss of the flexure element 22s is fixed to the support base part 12b of the second base 12 via screws T and the screw holes Th. This allows the flexure element 22s to be supported by the second base 12 (support base part 12b) in a cantilever manner with the first end 22ss being a fixed end, a second end 22sf being a free end.

Further, two screw holes Th penetrating the flexure element 22s in the up-down direction are formed in the vicinity of the second end 22sf of the flexure element 22s. The mounting plate 3 as described later is fixed to a lower surface 22sd of the flexure element 22s in the vicinity of the second end 22sf via screws T and the screw holes Th. Namely, the flexure element 22s (second load cell 22) supports the mounting plate 3, such that the mounting plate 3 is movable in the up-down direction, in the vicinity of the second end 22sf as the free end. In the arrangement relation between the flexure element 21s and the flexure element 22s, the first end (fixed end) 22ss of the flexure element 22s is in the same position, in the longitudinal direction, as the second end (free end) 21sf of the flexure element 21s, and the second end (free end) 22sf of the flexure element 22s is in the same position, in the longitudinal direction, as the first end (fixed end) 21ss of the flexure element 21s. Namely, the flexure element 21s and the flexure element 22s extend in the same direction while facing each other, and the fixed end and the free end of the flexure element 21s are positioned reversely to the fixed end and the free end of the flexure element 22s in the longitudinal direction. Further, the support base part 11b supporting the flexure element 21s is in substantially the same position as the second end (free end) 22sf of the flexure element 22s in the longitudinal direction, and the support base part 12b supporting the flexure element 22s is in substantially the same position as the second end (free end) 21sf of the flexure element 21s in the longitudinal direction.

The mounting plate 3, which is made of metal such as aluminum and iron, is a plate-shaped member on which an object to be detected (detection target) is to be placed. The mounting plate mainly includes a main body 31, a first connection part 32, and a second connection part 33. The main body 31 is a flat plate having a rectangular shape in planer view, the first connection part 32 extends from the vicinity of a first end of the main body 31 toward the first base 11, and the second connection part 33 extends from the vicinity of a second end of the main body 31 toward the second base 12.

Figure 3:
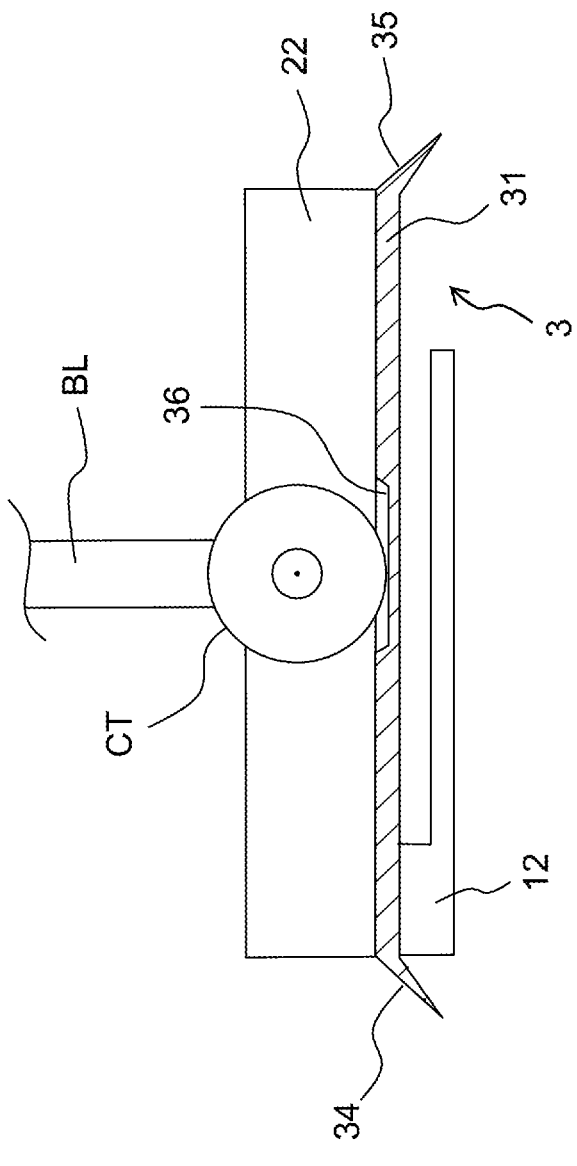
FIG. 3 is a vertical sectional view of a center part of the load detector in a width direction, depicting a state in which a caster of a bed is placed on a mounting plate.

A slope 34 is provided in the first end of the main body 31. A caster CT (FIG. 3) or the like rolls over the slope 34 to be placed on the main body 31. A slope 35 is provided in the second end of the main body 31 in a similar manner to the slope 34. As depicted in FIG. 3, lower ends of the slopes 34, 35 are separated from a floor, that is, they have no contact with the ground during the measurement in which a measurement target is placed on the mounting plate 3 (during a period in which the mounting plate 3 moves in the up-down direction). A concave part (movement restriction part) 36 (see FIG. 2) is formed in a center part of the main body 31 in the longitudinal direction and the width direction. The caster CT or the like is disposed in the concave part 36 of the main body 31 of the mounting plate 3 after rolling over the slope 34 or the slope 35. This restricts the movement of the caster CT in the longitudinal direction and the width direction.

The first connection part 32 includes two screw holes Th. The first connection part 32 is fixed to the lower surface 21sd of the flexure element 21s of the first load cell 21 in the vicinity of the second end (free end) 21sf via screws T and the screw holes Th. Similarly, the second connection part 33 includes two screw holes Th. The second connection part 33 is fixed to the lower surface 22sd of the flexure element 22s of the second load cell 22 in the vicinity of the second end (free end) 22sf via screws T and the screw holes Th. Namely, the mounting plate 3 is supported at two points by the first load cell 21 and the second load cell 22 to be finely movable in the up-down direction in a manner such that the vicinity of a corner of the main body 31 is fixed to the free end of the first load cell 21 and the vicinity of a corner diagonal to the corner of the main body 31 is fixed to the free end of the second load cell 22.

Subsequently, an explanation will be made about a method for using the load detector 100 by citing, as its example, a case in which the detection target is a human subject on a bed and the caster CT for moving the bed, that is attached to the lower end of a leg BL (FIG. 3) of the bed, is placed on the mounting plate 3.

When the load detection using the load detector 100 is performed, the caster CT is placed on the main body 31 of the mounting plate 3 first. Specifically, the caster CT is mounted on the main body 31 via the slope 34 or 35, and then disposed in the concave part 36. Accordingly, the caster CT is successfully placed on the main body 31 in a state that the movement of the caster CT is restricted in the longitudinal direction and the width direction. Other casters CT provided for the bed are placed on other load detectors 100, respectively.

The load of the human subject on the bed is transmitted to the flexure element 21s of the first load cell 21 and the flexure element 22s of the second load cell 22 which support the mounting plate 3, via the bed leg BL, the caster CT, and the mounting plate 3. The load transmitted generates the strain in flexure element 21s and the flexure element 22s, and the strain gages 21g, 22g each detects the strain as the change in a resistance value. The change in the resistance value is outputted to the controller (not depicted in the drawing), which is provided outside of the load detector 100, provided in the first base 11, or provided in the second base 12, via lead wires (not depicted in the drawing). Performing Arithmetic processing by the controller determines the load of the human subject.

Here, an explanation will be made about the reason why the load detector 100 related to this embodiment supports the mounting plate 3 at two points by use of the first load cell 21 and the second load cell 22.

Figure 4:
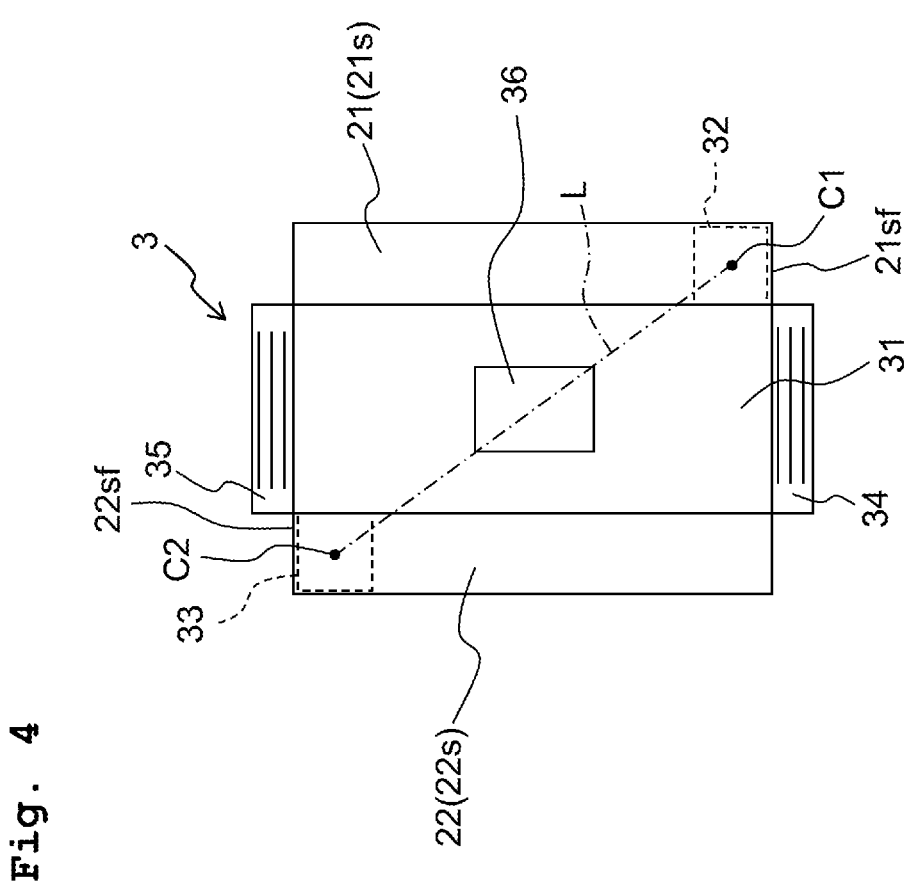
FIG. 4 is an illustrative view illustrating the relation between positions at which the mounting plate is fixed to load cells and a proper placement position of an object to be detected (detection target) on the mounting plate.

In the load detector 100 related to this embodiment, as depicted in FIG. 4, the mounting plate 3 is supported in the vicinity of the second end 21sf of the flexure element 21s of the first load cell 21 via the first connection part 32, and is supported in the vicinity of the second end 22sf of the flexure element 22s of the second load cell 22 via the second connection part 33, to be movable in the up-down direction.

Assuming that the center point of fixing of the first connection part 32 to the flexure element 21s is defined as a fixing center C1 and the center point of fixing of the second connection part 33 to the flexure element 22s is defined as a fixing center C2, a line L connecting the fixing center C1 and the fixing center C2 in the shortest distance is a part, of the main body 31 of the mounting plate 3, which is least likely to bend. Thus, disposing the caster CT of the bed on the line L enables the detection of load of the human subject on the bed without suffering the influence of bending of the mounting plate 3.

The load detector 100 related to this embodiment includes the concave part 36 to dispose the caster CT on the line L or in the vicinity thereof. Thus, it is possible to detect load of the human subject stably and precisely while disposing the caster CT on the line L or in the vicinity thereof in a stable manner.

Figure 5:
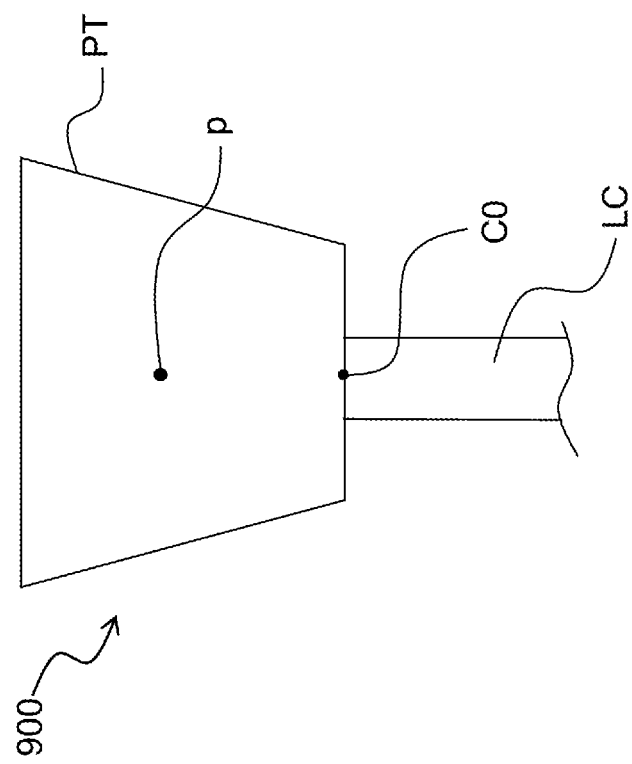
FIG. 5 is an illustrative view illustrating a placement position of the detection target on a mounting plate in a load detector using a single beam type load cell.

Here, an explanation will be made about the reason why the load detector related to the present disclosure can detect the load more stably and precisely than a conventional load detector using a beam-shaped load cell, with reference to FIG. 5 depicting a conventional load detector 900 using a load cell. As depicted in FIG. 5, the load detector 900 in which a mounting plate PT is connected to an end of a beam type load cell LC has a relatively small position deviation error, in a case that a placement position p of a detection target is in the vicinity of a connection position C0 between the beam type load cell LC and the mounting plate PT. The position deviation error, however, increases as the distance between the placement position p and the connection position C0 increases. The reason thereof is as follows. Namely, as the distance between the placement position p and the connection position C0 in a longitudinal direction of the beam type load cell LC increases, the bending moment, of which degree depends on the distance between the placement position p and the connection position C0 in the longitudinal direction, acts on a flexure element of the beam type load cell LC around an axis extending in a width direction of the beam type load cell LC to cause the strain in the flexure element. This strain causes a position deviation error in a strain gage of the beam type load cell LC. Further, as the distance between the placement position p and the connection position C0 in the width direction of the beam type load cell LC increases, the torsional or twisting moment, of which degree depends on the distance between the placement position p and the connection position C0 in the width direction, acts on the flexure element of the beam type load cell LC around an axis extending in the longitudinal direction of the beam type load cell LC to cause the strain in the flexure element. This strain causes a position deviation error in the strain gage of the beam type load cell LC.

Figure 6:
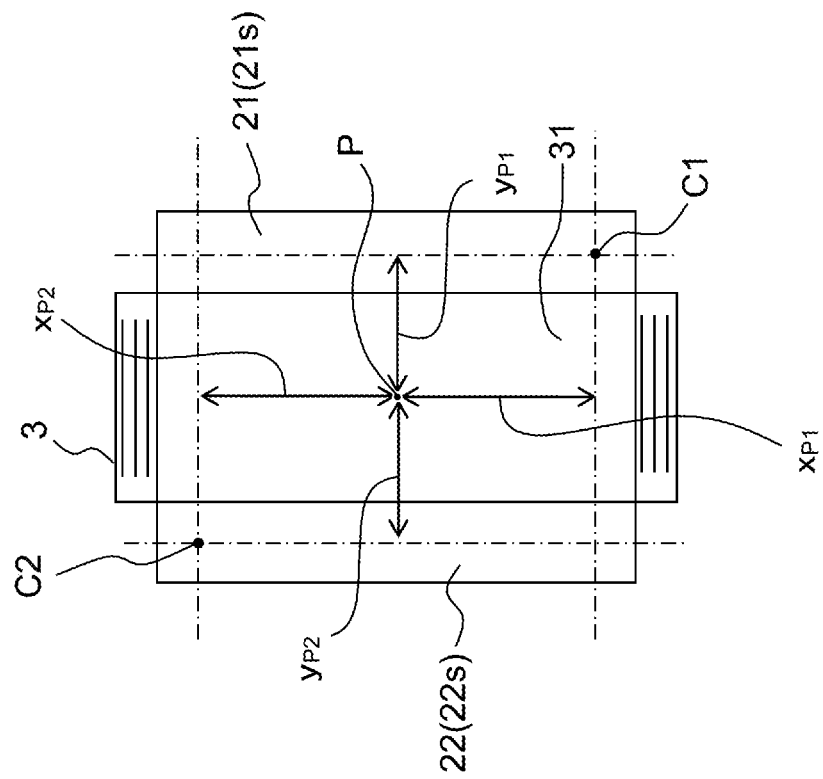
FIG. 6 is an illustrative view illustrating distances, in a longitudinal direction and the width direction, between a position of the detection target on the mounting plate and positions at which the mounting plate is fixed to the load cells.

In the load detector 100 related to this embodiment, as depicted in FIG. 6, assuming that a distance, in the longitudinal direction, between the fixing center C1 and the placement position P of the detection target placed on the main body 31 of the mounting plate 3 is defined as a distance $x_{P1}$ and that a distance, in the longitudinal direction, between the fixing center C2 and the placement position P is defined as a distance $x_{P2}$, the total of the distances $x_{P1}$, $x_{P2}$ is constant over almost the whole area of the main body 31 of the mounting plate 3. Thus, even when the placement position P is displaced in a front-rear direction in the load detector 100 related to this embodiment, the total of the position deviation error caused in the first load cell 21 by the bending moment and the position deviation error caused in the second load cell 22 by the bending moment is approximately constant at all times. Therefore, the influence of the position deviation error caused by the bending moment is virtually removed, for example, by allowing the controller (not depicted in the drawings) to sum up detection values of the first load cell 21 and the second load cell 22 and to subtract a predetermined value as the position deviation error therefrom. The load of the detection target can be stably detected, accordingly.

Further, as depicted in FIG. 6, assuming that a distance, in the width direction, between the fixing center C1 and the placement position P of the detection target placed on the main body 31 of the mounting plate 3 is defined as a distance $y_{P1}$ and that a distance, in the width direction, between the fixing center C2 and the placement position P is defined as a distance $y_{P2}$, the total of the distances $y_{P1}$, $y_{P2}$ is constant over almost the whole area of the main body 31 of the mounting plate 3. Thus, even when the placement position P is displaced in the width direction in the load detector 100 related to this embodiment, the total of the position deviation error caused in the first load cell 21 by the torsional moment and the position deviation error caused in the second load cell 22 by the torsional moment is approximately constant at all times. Therefore, the influence of the position deviation error caused by the torsional moment is virtually removed, for example, by allowing the controller (not depicted in the drawings) to sum up detection values of the first load cell 21 and the second load cell 22 and to subtract a predetermined value as the position deviation error therefrom. The load of the detection target can be stably detected, accordingly.

Effects of the load detector 100 related to this embodiment are summarized as follows.

In the load detector 100 related to this embodiment, the mounting plate 3 is supported, in the vicinity of a corner of the mounting plate 3 by use of the first load cell 21 and in the vicinity of a corner diagonal to the corner of the mounting plate 3 by use of the second load cell 22, to be movable in the up-down direction. Thus, disposing the detection target on the line L connecting the corner and the diagonal corner of the mounting plate 3 or in the vicinity thereof results in a successful detection of load of the detection target without suffering the influence of bending of the mounting plate 3.

In the load detector 100 related to this embodiment, the concave part 36 is formed in the center of the mounting plate 3 in the longitudinal direction and the width direction. Thus, even when an object to be placed on the mounting plate 3 during detection is a rolling body, such as the caster CT of the bed, the load detector 100 can detect the load stably and precisely while holding the object on the line L of the mounting plate 3 or in the vicinity of the line L.

In the load detector 100 related to this embodiment, the total value of position deviation errors which are caused in the first and second load cells 21, 22 by the bending moment and the total value of position deviation errors which are caused in the first and second load cells 21, 22 by the torsional moment are approximately constant at all times. Therefore, the influence of each position deviation error is virtually removed by allowing the controller to sum up detection values of the first load cell 21 and the second load cell 22 and to subtract the position deviation error, which is an approximately constant value, therefrom. The stable and precise load detection can be performed, accordingly.

In the load detector 100 related to this embodiment, the first load cell 21 and the second load cell 22 supporting the mounting plate 3 are disposed on both sides of the mounting plate 3 in the width direction. This allows the caster CT to enter the mounting plate 3 disposed between two load cells 21, 22 without being interfered with the two load cells. Namely, the caster CT can enter the mounting plate 3 from any of the free-end side of the first load cell 21 and the free-end side of the second load cell 22. Further, the slopes 34, 35, which are provided at both ends of the mounting plate 3 in the longitudinal direction, facilitate the placement of the caster CT. In a process of arranging the load detector 100 under the bed, it is enough to align the longitudinal direction of the load cell to a direction in which the bed is moved to place the casters CT on the mounting plates 3, and thus, the load detector 100, especially a plurality of load detectors 100 can be arranged under the bed easily.

Subsequently, an explanation will be made about a method for manufacturing the load detector 100 related to this embodiment.

In the manufacture of the load detector 100 related to this embodiment, at first, the first base 11, the second base 12, the first load cell 21, the second load cell 22, and the mounting plate 3 are formed individually. The first and second bases 11, 12 may be made of any material such as resin or metal, and examples of the material include rolled aluminum. The mounting plate 3 can be formed easily by performing cutting, bending, and the like for a rolled aluminum plate and providing the first and second connection parts 32, 33 and the slopes 34, 35.

Next, the first base 11, the second base 12, the first load cell 21, the second load cell 22, and the mounting plate 3 formed individually are integrally fixed by using screws T. Accordingly, the load detector 100 related to this embodiment has a small number of components, and it can be manufactured only through easy steps, such as cutting, bending, and screwing.

<Modified Examples>

Subsequently, an explanation will be made about a load detector 200 related to a modified example of the first embodiment with reference to FIGS. 7 and 8. The load detector 200 related to the modified example is identical to the load detector 100 related to the first embodiment in that the first base 11, the second base 12, the first load cell 21, and the second load cell 22 are provided as its components. The load detector 200, however, is different from the load detector 100 in that a mounting plate (mounting part) 4 fixed to the upper surface 21st of the flexure element 21s of the first load cell 21 and an upper surface 22st of the flexure element 22s of the second load cell 22 is provided instead of the mounting plate 3 fixed to the lower surface 21sd of the flexure element 21s and the lower surface 22sd of the flexure element 22s.

Figure 7:
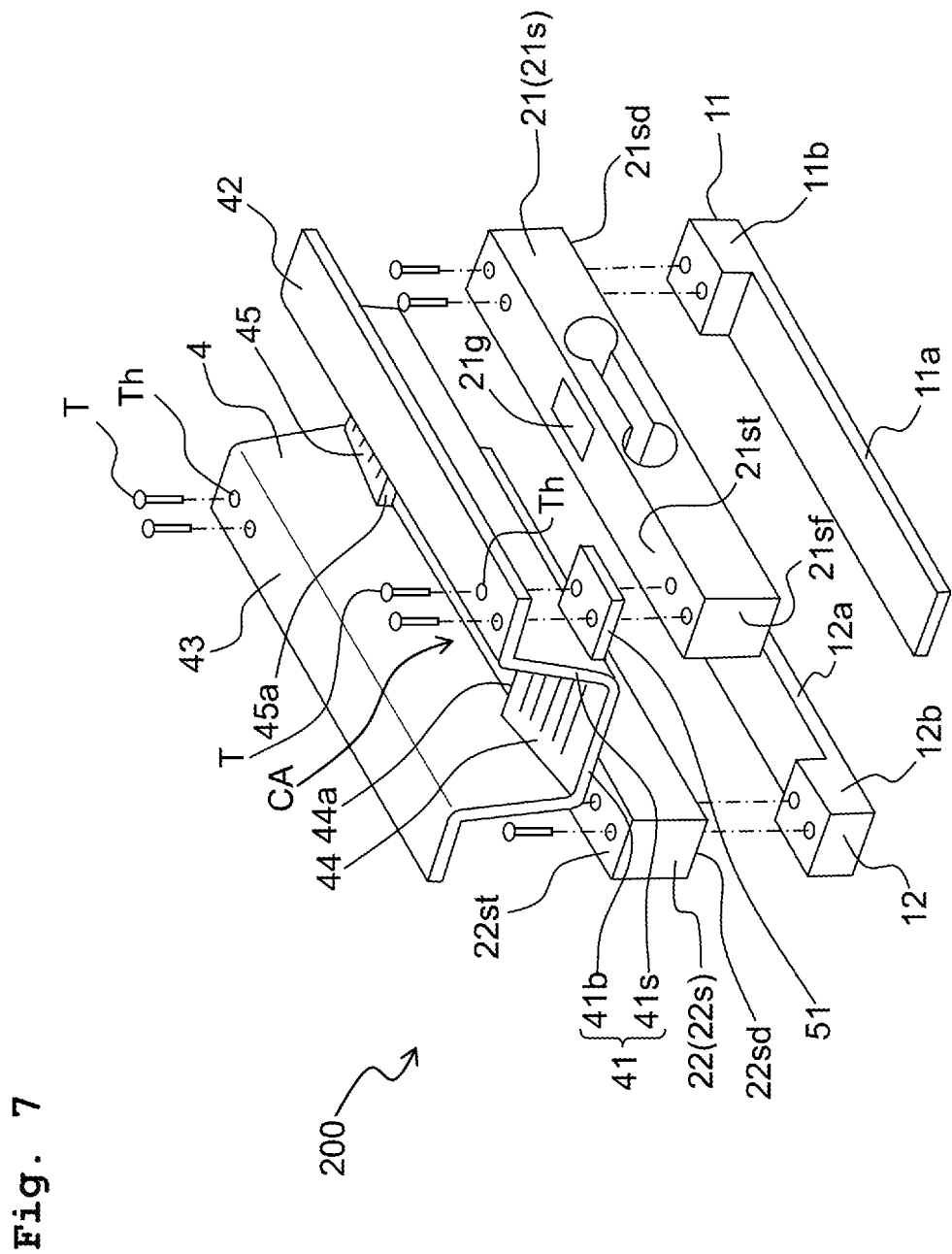
FIG. 7 is an exploded perspective view of a load detector related to a modified example of the first embodiment of the present disclosure.
Figure 8:
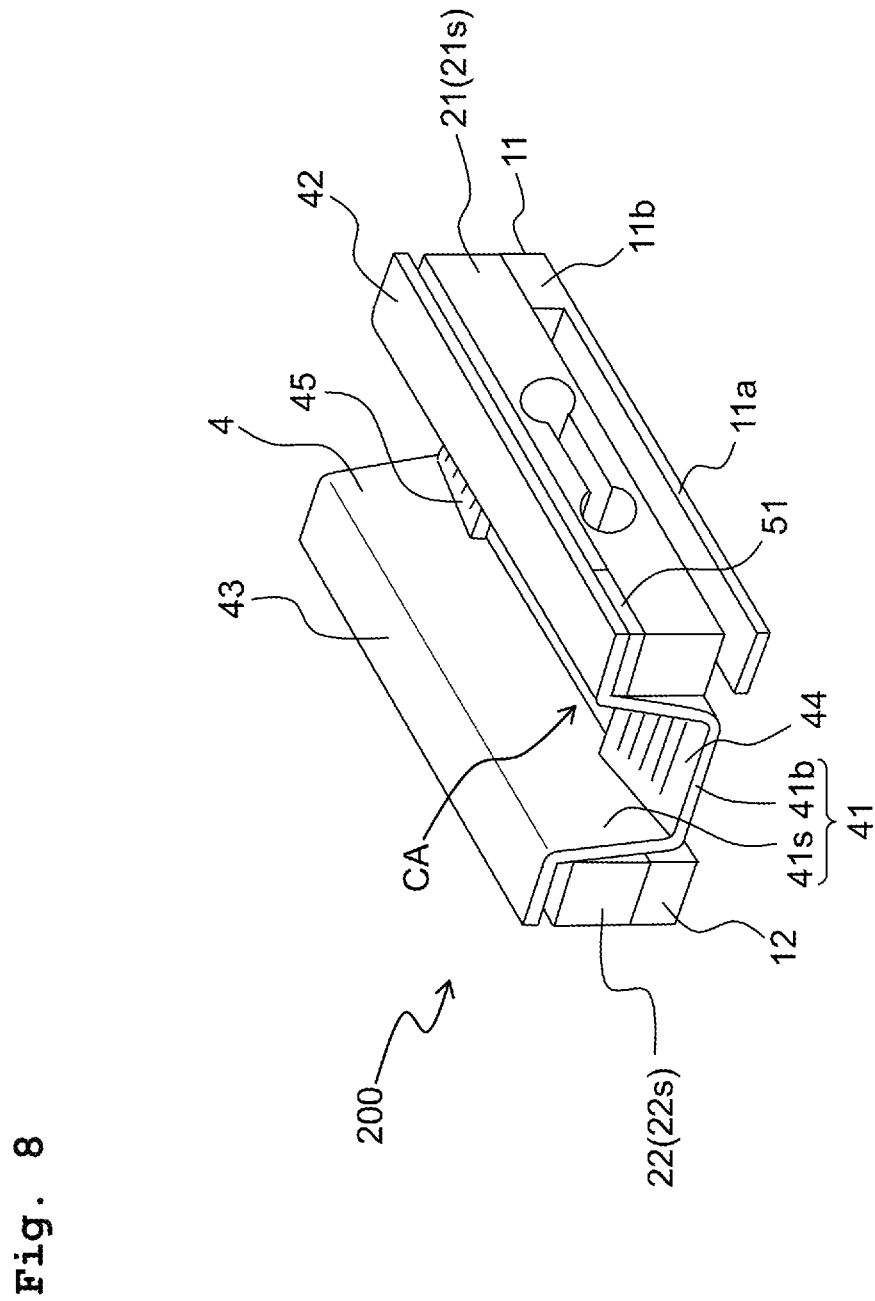
FIG. 8 is a perspective view of the load detector related to the modified example of the first embodiment of the present disclosure.

Since the first base 11, the second base 12, the first load cell 21, and the second load cell 22 in the load detector 200 depicted in FIGS. 7 and 8 are the same as those in the load detector 100 related to the first embodiment, the explanation thereof will be omitted.

The mounting plate 4, which supports a detection target, is formed of a rolled aluminum plate. The mounting plate 4 mainly includes a concave part 41, a first connection part 42, and a second connection part 43. The concave part 41 has a bottom surface 41b which is rectangular in planar view and lateral surfaces 41s each of which is rectangular in side view. The first connection part 42, which is rectangular in planer view, extends nearly horizontally from an upper end of one of the lateral surfaces 41s toward the first base 11. The second connection part 43, which is rectangular in planer view, extends nearly horizontally from an upper end of the other of the lateral surfaces 41s toward the second base 12. The cross-sectional shape, of the concave part 41 orthogonal to the longitudinal direction of the first load cell 21 is an approximately U-shape. Namely, the mounting plate 4 is a bent plate in which a U-shaped groove extending nearly parallel to the longitudinal direction of the first load cell 21 is defined between the first load cell 21 and the second load cell 22.

Slopes 44, 45, which incline upward toward the center in the longitudinal direction, are provided in the vicinities of both ends of the bottom surface 41b of the concave part 41 in the longitudinal direction. The slopes 44, 45 define a holding area (movement restriction part) CA, which is surrounded by an end surface 44a of the slope 44, an end surface 45a of the slope 45, and the lateral surfaces 41s of the concave part 41, in a center part of the bottom surface 41b of the concave part 41 in the longitudinal direction.

Two screw holes Th are formed in the vicinity of an end of the first connection part 42 in the longitudinal direction. The first connection part 42 is fixed to the vicinity of the second end (free end) 21sf of the flexure element 21s of the first load cell 21 via screws T and the screw holes Th in a state that a flat plate-shaped spacer 51 is sandwiched by the first connection part 42 and the first load cell 21 in the up-down direction.

Similarly, two screw holes Th are formed in the vicinity of an end of the second connection part 43 in the longitudinal direction, the end of the second connection part 43 being positioned diagonally to the end of the first connection part 42. The second connection part 43 is fixed to the vicinity of the second end (free end) 22sf of the flexure element 22s of the second load cell 22 via screws T and the screw holes Th in a state that a spacer (not depicted in the drawings) similar to the spacer 51 is sandwiched by the second connection part 43 and the second load cell 22 in the up-down direction. Namely, the mounting plate 4 is supported at two points by the first load cell 21 and the second load cell 22 to be finely movable in the up-down direction in a manner such that the vicinity of a corner of the rectangular bottom surface 41b of the concave part 41 is fixed to the free end of the first load cell 21 and the vicinity of a corner diagonal to the corner of the bottom surface 41b is fixed to the free end of the second load cell 22.

The load detector 200 related to the modified example of the first embodiment can be used similarly to the load detector 100 related to the first embodiment.

The load detector 200 related to the modified example of the first embodiment can obtain effects similar to those obtained by the load detector 100 related to the first embodiment.

In the load detector 200 related to the modified example of the first embodiment, the mounting plate 4 includes the concave part 41, which includes the bottom surface 41b having a width smaller than the distance between the first load cell 21 and the second load cell 22 in the width direction. This structure makes the mounting plate 4 difficult to bend when the load is applied from the upper side of the mounting plate 4. Accordingly, the load detector 200 can further reduce the influence of bending of the mounting plate 4 as compared with the load detector 100.

In the load detector 200 related to the modified example of the first embodiment, each of the lateral surfaces 41s of the concave part 41 of the mounting plate 4 is disposed between the first load cell 21 and the holding area CA, and between the second load cell 22 and the holding area CA. This prevents the caster CT or the like placed in the holding area CA from hitting against the first and second load cells 21, 22.

In the load detector 200 related to the modified example of the first embodiment, the first load cell 21 and the second load cell 22 supporting the mounting plate 4 are disposed on both sides of the bottom surface 41b of the concave part 41 of the mounting plate 4 in the width direction. Thus, when the detection target is a human subject on a bed and the caster CT for moving the bed, that is attached to the lower end of the leg BL (FIG. 3) of the bed, is placed on the mounting plate 4, the caster CT can enter the mounting plate 4 disposed between two load cells 21, 22 without being interfered with the two load cells. Namely, the caster CT can enter the mounting plate 4 from any of the free-end side of the first load cell 21 and the free-end side of the second load cell 22. Further, the slopes 44, 45 provided for the mounting plate 4 facilitate the placement of the caster CT onto the bottom surface 41b. The movement, of the caster CT placed on the bottom surface 41b, in the longitudinal direction is restricted by the end surfaces 44a, 45a of the slopes 44, 45, and the movement thereof in the width direction is restricted by the lateral surfaces 41s of the concave part 41.

Subsequently, an explanation will be made about a load detector 300 related to another modified example of the first embodiment with reference to FIGS. 9 and 10. The load detector 300 related to this modified example is identical to the load detector 100 related to the first embodiment in that the first base 11, the second base 12, the first load cell 21, and the second load cell 22 are provided as its components. The load detector 300, however, is different from the load detector 100 in that a mounting plate (mounting part) 5 which includes a wall 54 and in which a cutout N is defined is provided instead of the flat plate-shaped mounting plate 3 and in that a guide member 6 fixed to the second base 12 is provided as its component.

Figure 9:
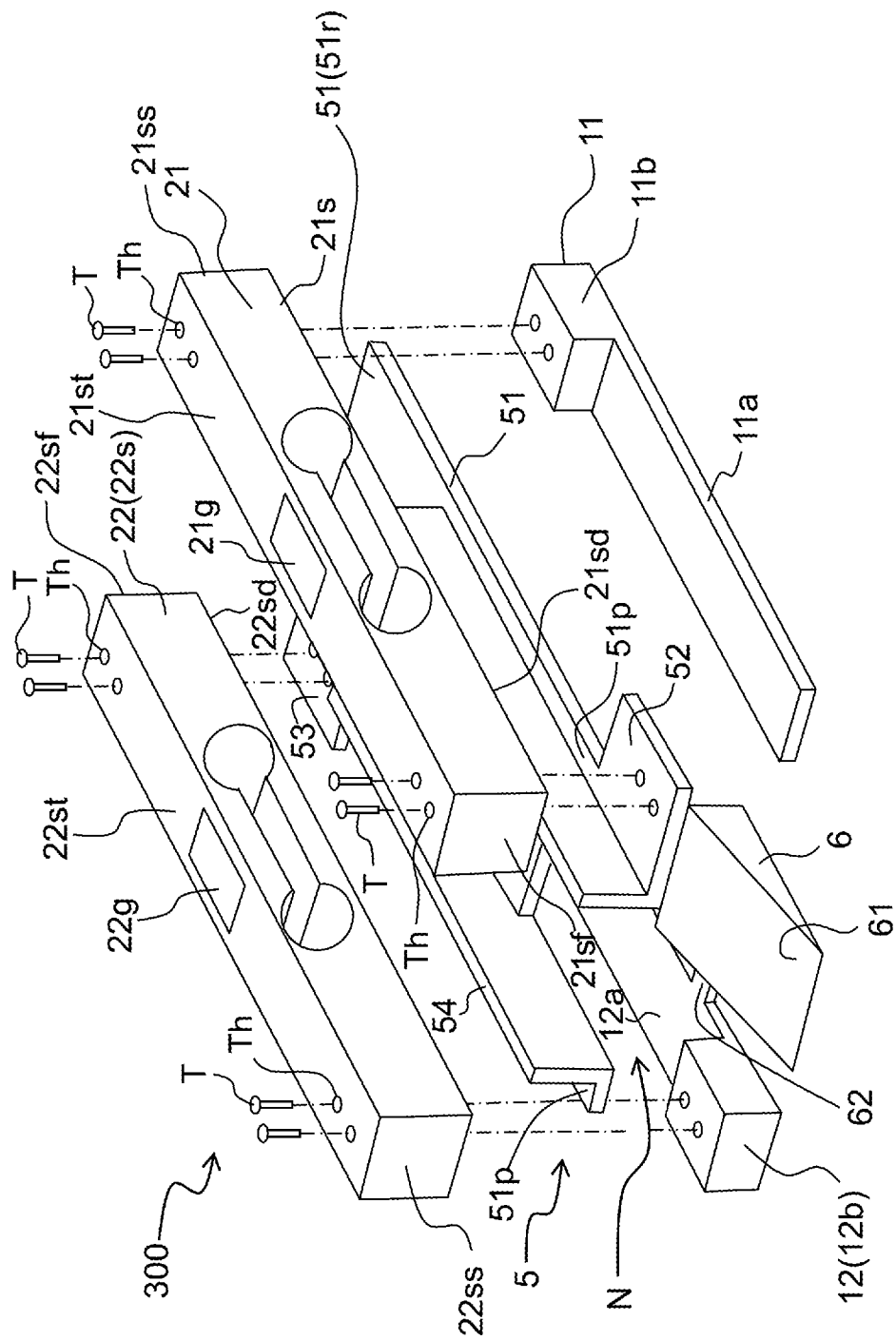
FIG. 9 is an exploded perspective view of a load detector related to another modified example of the first embodiment of the present disclosure.
Figure 10:
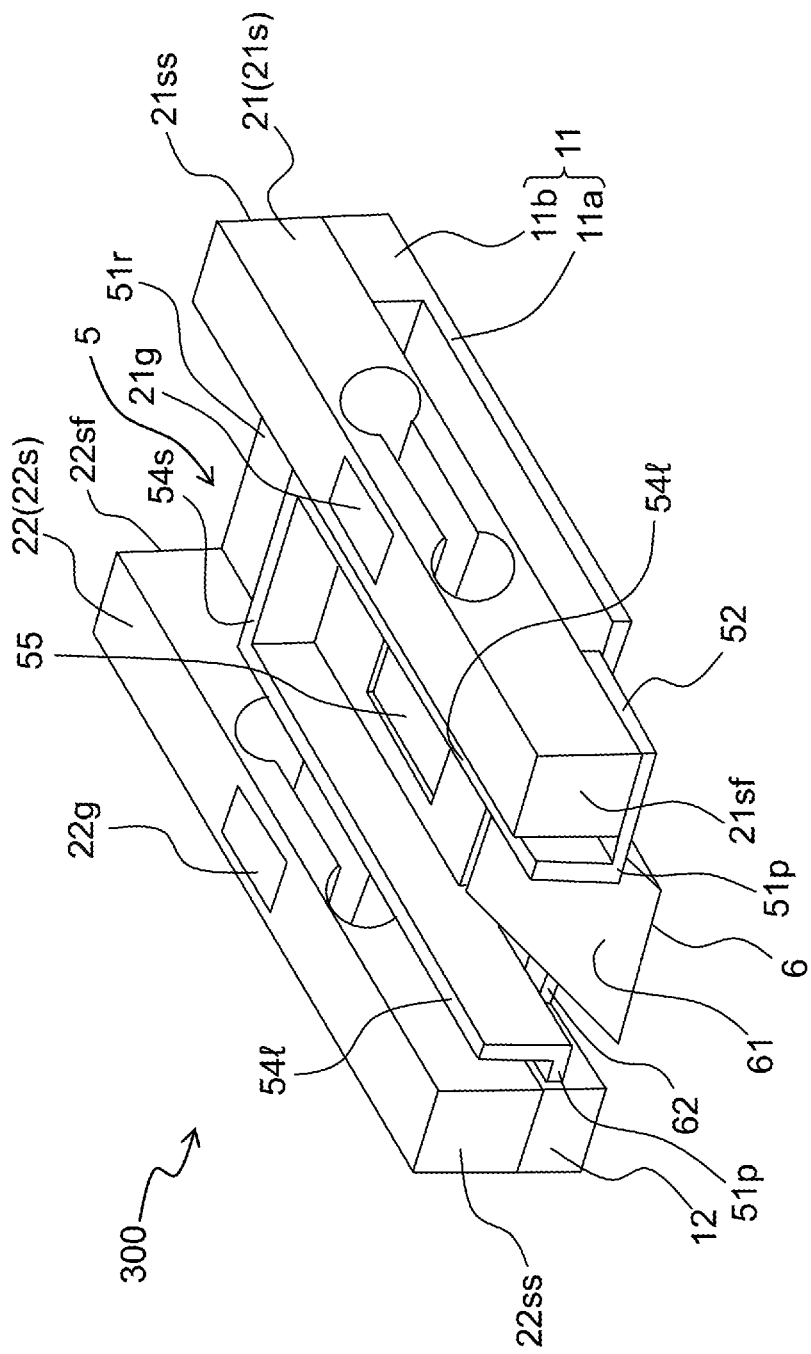
FIG. 10 is a perspective view of the load detector related to the another modified example of the first embodiment of the present disclosure.

Since the first base 11, the second base 12, the first load cell 21, and the second load cell 22 in the load detector 300 depicted in FIGS. 9 and 10 are the same as those in the load detector 100 related to the first embodiment, the explanation thereof will be omitted.

The mounting plate 5, on which a detection target is to be placed similar to the mounting plate 3, includes a flat plate-shaped main body 51, a first connection part 52, a second connection part 53, and the wall 54. The first connection part 52 extends from the main body 51 toward the first base 11, and the second connection part 53 extends from the main body 51 toward the second base 12. The wall 54 is formed to stand upright from the upper surface of the main body 51.

The main body 51 includes a rectangular part 51r and protruding parts 51p. The long side of the rectangular part

51*r* extends in an extending direction (longitudinal direction) of the first and second load cells 21, 22. The protruding parts 51*p* protrude or extend from one short side of the rectangular part 51*r* in the long side direction of the rectangular part 51*r*. Each of the protruding parts 51*p* is positioned in the vicinities of each ends of the rectangular part 51*r* in the short side direction. The cutout N is defined by the protruding parts 51*p* and one short side of the rectangular part 51*r*.

The first connection part 52 extends from one of the protruding parts 51*p* toward the first base 11. The first connection part 52 includes two screw holes Th. The first connection part 52 is fixed to the lower surface 21*sd* of the flexure element 21*s* of the first load cell 21 in the vicinity of the second end (free end) 21*sf* via screws T and the screw holes Th.

The second connection part 53 extends from an end, of the rectangular part 51*r*, opposite to the end at which the protruding parts 51*p* are provided, toward the second base 12. The second connection part 53 includes two screw holes Th. The second connection part 53 is fixed to the lower surface 22*sd* of the flexure element 22*s* of the second load cell 22 in the vicinity of the second end (free end) 22*sf* via screws T and the screw holes Th.

The wall 54, which has a substantially U-shape in planer view, includes long wall parts 541 and a short wall part 54*s* (FIG. 10). The long wall parts 541 extend in the long side direction of the rectangular part 51*r* of the main body 51, and the short wall part 54*s* extends in the short side direction of the rectangular part 51*r* of the main body 51 to connect the long wall parts 541. The long wall parts 541 are positioned on the main body 51 to extend along the entire areas of the protruding parts 51*p* and large portions of long sides of the rectangular part 51*r*.

A concave part (movement restriction part) 55 (FIG. 10) is provided in a center area, of the upper surface of the rectangular part 51*r* of the main body 51, surrounded by the wall 54 and the cutout N. The concave part 55 is approximately rectangular in planar view. The center of the concave part 55 is almost positioned on a diagonal line connecting the center of the first connection part 52 and the center of the second connection part 53 in planar view.

The guide member 6, which has a wedge shape (or is a triangular prism), includes an inclined surface (slope) 61 by which the rolling body such as the caster CT is guided from a floor onto the mounting plate 5. The guide member 6, which is fixed to the flat plate 12*a* of the second base 12 via a connection part 62 extending from a lateral surface orthogonal to the inclined surface 61, is positioned between the first base 11 and the second base 12 on the lower side of the mounting plate 5. The inclined surface 61 of the guide member 6 is positioned in the cutout N defined by the mounting plate 5 in planar view. The lower end of the inclined surface 61 is positioned between the second end (free end) 21*sf* of the first load cell 21 and the second end (free end) 22*sf* of the second load cell 22 in the longitudinal direction of the first load cell 21. Namely, the guide member 6 is within the size of the first load cell 21 and the second load cell 22 in the longitudinal direction.

This modified example is different from the first embodiment in that the mounting plate 5 changes its position independently of the guide member 6 having the inclined surface 61. Specifically, the mounting plate 5 can change its position independently of the inclined surface (slope) 61. The guide member 6 is fixed to the second base 12 in a manner such that the lower end of the inclined surface 61 is provided substantially coplanar with the lower surfaces of the first and second bases 11, 12. When the load detector 300 is placed on the floor, the lower end of the inclined surface 61 of the guide member 6 contacts the floor. The mounting plate 5 changes its positon independently of the guide member 6, and thus the contact between the inclined surface 61 and the floor has no influence on load measurement.

In this modified example, the height of the inclined surface 61 is substantially the same as the distance between the lower surfaces of the first and second bases 11, 12 and the upper surface of the mounting plate 5. Thus, in the load detector 300 related to this modified example, the upper end of the inclined surface 61 of the guide member 6 is substantially coplanar with the upper surface of the mounting plate 5. This allows the caster CT, which has reached the upper end of the inclined surface 61 after rolling thereover, to be easily moved onto the upper surface of the mounting plate 5.

The load detector 300 related to this modified example can be used similarly to the load detector 100 related to the first embodiment, and the load detector 300 can obtain effects similar to those obtained by the load detector 100 related to the first embodiment.

In the load detector 300 related to this modified example, the rolling body such as the caster CT can be easily guided from the floor onto the upper surface of the mounting plate 5 by using the inclined surface 61 of the guide member 6.

In the load detector 300 related to this modified example, the mounting plate 5 defines the cutout N and the guide member 6 is disposed in the cutout N in planer view. Further, the lower end of the inclined surface 61 is positioned between the second end (free end) 21*sf* of the first load cell 21 and the second end (free end) 22*sf* of the second load cell 22 in the longitudinal direction of the first load cell 21. Thus, the guide member 6 and the inclined surface 61 do not extend beyond the first load cell 21 and the second load cell 22 in the longitudinal direction, resulting in the compact load detector 300.

In the load detector 300 related to this modified example, the wall 54 is provided on the upper surface of the main body 51 of the mounting plate 5. This prevents the rolling body such as the caster CT placed in the concave part 55 from hitting against the first and second load cells 21, 22.

The load detector 300 related to this modified example may adopt the following modified configurations.

In the load detector 300 related to this modified example, the guide member 6 may not be fixed to the second base 12. The guide member 6 may be fixed to the first base 11 or to both of the first base 11 and the second base 12. Further, the guide member 6 may be disposed to extend beyond the first and second load cells 21, 22 in the longitudinal direction. In addition to the above, the guide member 6 may be fixed to any member by any method so that the mounting plate 5 has no contact with the guide member 6 to be movable independently of the guide member 6. The guide member 6 does not need to be permanently fixed to the second base 12 or the like, that is, it may be removable.

In the load detector 300 related to this modified example, the guide member 6 may not have the wedge shape. The guide member 6 may have, for example, a flat plate shape with an inclined surface (slope). The inclined angle of the inclined surface (slope) may not be constant or fixed, and it may change in a travelling direction of the rolling body such as the caster CT.

In the load detector 300 related to this modified example, the mounting plate 5 may have any shape. The mounting plate 5 may not have the wall 54, and the main body 51 of the mounting plate 5 may not have the protruding parts 51*p*.

In a case that the main body 51 has no protruding parts 51p, the first connection part 52 may extend from the rectangular part 51r of the main body 51. Alternatively, in the mounting plate 5 having the wall 54, the main body 51 may not have the protruding parts 51p. In this case, the first connection part 52 may be provided in the long wall parts 541 of the wall 54. It is preferred that the concave part 55, which may be provided for the mounting plate 5 in any shape, be positioned on a line connecting the first connection part 52 and the second connection part 53 in planer view. This configuration, however, is not indispensable. A mounting part, which curves like the mounting plate 4, may be used instead of the mounting plate 5.

In the first embodiment and its modified examples, the flat plate 11a of the first base 11 and the flat plate 12a of the second base 12 may each have any length in the longitudinal direction. Further, one or both of the flat plates 11a, 12a may be omitted.

In the first embodiment and its modified examples, the first base 11 and the second base 12 are components separated from each other. The present disclosure, however, is not limited thereto. The first base 11 and the second base 12 may be formed integrally, for example, a flat plate extending below the mounting plate 3 may connect the flat plate 11a and the flat plate 12a.

In the first embodiment and its modified examples, the first load cell 21 and the second load cell 22 are respectively fixed to the first base 11 and the second base 12 by screws T. The present disclosure, however, is not limited thereto. The first load cell 21 and the second load cell 22 may be respectively fixed to the first base 11 and the second base 12 by bolts, rivets, or welding.

In the first embodiment and its modified examples, the first load cell 21 is fixed to the first base 11 in a state that the top surface 11bt of the support base part 11b contacts the lower surface 21sd of the flexure element 21s. The present disclosure, however, is not limited thereto. The first load cell 21 may be fixed to the first base 11, for example, in a state that the front surface of the support base part 11b contacts an end surface of the flexure element 21s in the longitudinal direction. The same is true on the fixing of the second load cell 22 to the second base 12.

In the first embodiment and its modified examples, the first load cell 21 and the second load cell 22 face each other in parallel. The first load cell 21 and the second load cell 22, however, may face each other while having an angle smaller than about 5°.

In the first embodiment and its modified examples, two strain gage 21g are attached to the flexure element 21s of the first load cell 21 and two strain gages 22g are attached to the flexure element 22s of the second load cell 22. The present disclosure, however, is not limited thereto, and three or more of strain gages 21g, 22g may be attached to the flexure elements 21s, 22s, respectively.

In the first embodiment and its modified examples, the first connection parts 32, 42, 52 of the mounting plates 3, 4, 5 are each fixed to the vicinity of the second end 21sf of the flexure element 21s of the first load cell 21. The present disclosure, however, it not limited thereto, and the first connection parts 32, 42, 52 of the mounting plates 3, 4, 5 may each be fixed to any position of the flexure element 21s of the first cell 21 on the side closer to the second end 21sf (the side closer to the free end) from the center of the flexure element 21s in the longitudinal direction. Further, the first connection parts 32, 42, 52 of the mounting plates 3, 4, 5 may each be fixed to any position of the flexure element 21s of the first load cell 21 on the side closer to the free end from the thin parts 21th of the flexure element 21s. The same is true on the fixing of the second connection parts 33, 43, 53 of the mounting plates 3, 4, 5 to the flexure element 22s of the second load cell 22. Namely, the second connection parts 33, 43, 53 of the mounting plates 3, 4, 5 may each be fixed to any position of the flexure element 22s of the second load cell 22 on the side closer to the second end 22sf (the side closer to the free end) from the center of the flexure element 22s in the longitudinal direction.

In the first embodiment and its modified examples, the mounting plates 3, 4, 5 are each fixed to the first load cell 21 and the second load cell 22 by screws T. The present disclosure, however, is not limited thereto. The mounting plates 3, 4, 5 may be fixed to the first load cell 21 and the second load cell 22 by bolts, rivets, or welding.

In the first embodiment, the first and second connection parts 32, 33 of the mounting plate 3 are respectively formed at ends of the main body 31 in the longitudinal direction. The present disclosure, however, is not limited thereto. The first and second connection parts 32, 33 maybe provided in any positions, of the main body 31 such that the center of the main body 31 (or the mounting plate 3) in the longitudinal direction is positioned between the first connection part 32 and the second connection part 33 in the longitudinal direction.

In the first embodiment and its modified examples, the first connection parts 32, 52 of the mounting plates 3, 5 are each formed as a flat plate extending in a horizontal direction. The first connection parts 32, 52, however, may each have a shape including a flat plate extending in a vertical direction perpendicular to the longitudinal direction. In this case, the mounting plates 3, 5 are each fixed to the first load cell 21 in a state that a surface of the flat plate extending in the vertical direction contacts an end surface of the flexure element 21s of the first load cell 21 in the longitudinal direction. The same is true on the fixing of the mounting plates 3, 5 to the second connection parts 33, 53.

In the first embodiment, the length of the main body 31 of the mounting plate 3 in the longitudinal direction is identical to the length of the first and second load cells 21, 22 in the longitudinal direction. The present disclosure, however, is not limited thereto. The main body 31 of the mounting plate 3 may be shorter or longer than the first and second load cells 21, 22.

In the modified example, the first and second connection parts 42, 43 of the mounting plate 4 are respectively fixed to the first and second load cells 21, 22 in the vicinities of ends of the bottom surface 41b of the concave part 41 in the longitudinal direction. The present disclosure, however, is not limited thereto. The first and second connection parts 42, 43 may be respectively fixed to the first and second load cells 21, 22 in any manner, such that the center of the bottom surface 41b (or the mounting plate 4) in the longitudinal direction is positioned between a position at which the first connection part 42 is connected to the first load cell 21 and a position at which the second connection part 43 is connected to the second load cell 22 in the longitudinal direction.

In the modified example, flat plates extending in the vertical direction perpendicular to the longitudinal direction may be provided at ends of the first and second connection parts 42, 43 of the mounting plate 4. In this case, the mounting plate 4 is fixed to the first and second load cells 21, 22 in a manner such that surfaces of the flat plates extending in the vertical direction contact end surfaces of the flexure elements 21s, 22s of the first and second load cells 21, 22 in the longitudinal direction with a predetermined interval between the lower surfaces of the first and second connection parts 42, 43 and the upper surfaces of the flexure elements 21s, 22s. Spacers may or may not be disposed between the first and second connection parts 42, 43 and the flexure elements 21s, 22s.

In the modified example, the length of the mounting plate 4 in the longitudinal direction is identical to the length of the first and second load cells 21, 22 in the longitudinal direction. The present disclosure, however, is not limited thereto. The mounting plate 4 may be shorter or longer than the first and second load cells 21, 22.

In the load detector 100 related to the first embodiment and the load detector 300 related to the modified example, the mounting plates 3, 5 may each be fixed to the upper surface 21st of the flexure element 21s of the first load cell 21 and the upper surface 22st of the flexure element 22s of the second load cell 22.

In the load detector 200 related to the modified example, the mounting plate 4 may be fixed to the lower surface 21sd of the flexure element 21s of the first load cell 21 and the lower surface 22sd of the flexure element 22s of the second load cell 22.

In the load detector 100 related to the first embodiment, one or both of the slopes 34, 35 of the mounting plate 3 may be omitted. When one of the slopes 34, 35 is omitted, a nearly vertical wall may be formed at an end, of the main body 31 of the mounting plate 3, having no slope to prevent the caster CT or the like from passing therethrough. Similarly, in the load detector 200 related to the modified example, one or both of the slopes 44, 45 of the mounting plate 4 may be omitted. When one of the slopes 44, 45 is omitted, a nearly vertical wall connected to the bottom surface 41b and the lateral surface 41s may be formed at an end, of the concave part 41 of the mounting plate 4, having no slope.

In the load detector 100 related to the first embodiment, the mounting plate 3 may not include the concave part 36.

<Second Embodiment>

An explanation will be made about a load detection system 500 related to a second embodiment with reference to FIG. 11.

The load detection system 500 mainly includes four load detectors 100 and a controller CONT. The four load detectors 100 are connected to the controller CONT by wiring.

Figure 11:
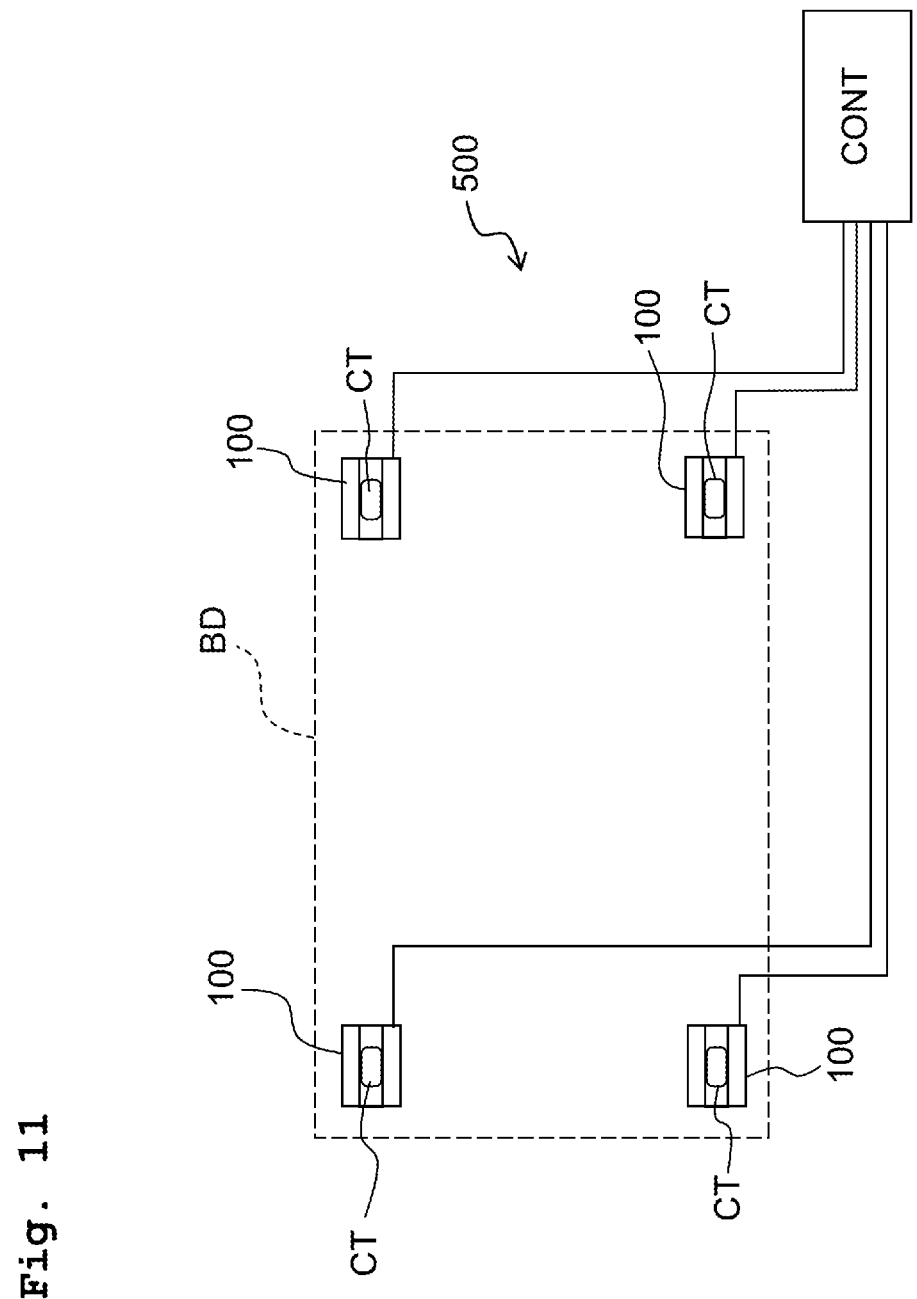
FIG. 11 is a schematic view depicting a configuration of a load detection system related to a second embodiment of the present disclosure.

When the load detection system 500 is used, four casters CT fixed one-to-one to four legs of a bed BD are respectively placed on the mounting plates 3 of the four load detectors 100 (FIG. 11). This allows each of the four load detectors 100 to detect a part of the load, of a human subject on the bed BD, which is applied to each detector via the corresponding leg of the bed BD.

The controller CONT connected to the four load detectors 100 executes a load calculation process, in which the output from the first load cell 21 and the output from the second load cell 22 of each load detector 100 are summed and a predetermined value corresponding to a position deviation error is subtracted, and a load summing-up process in which the loads detected by the load detectors 100 are summed. The controller CONT may execute any other processes.

The load detection system related to the second embodiment uses the load detectors 100 related to the first embodiment, thereby obtaining the same effects as those of the load detector 100 related to the first embodiment.

In the load detection system related to the second embodiment, the number of load detectors 100 is not limited to four. Three or less or five or more of load detectors 100 may be used in the load detection system. Further, the load detector 200 or the load detector 300 related to each modified example may be used instead of the load detector 100.

The load detection system related to the second embodiment may be used in a manner such that the legs of the bed BD are placed directly on the mounting plates 3 of the load detector 100, rather than placing the casters CT on the mounting plates 3. When each leg of the bed is formed of two parts divided in an up-down direction, the load of the human subject can be detected by disposing the first and second bases 11, 12 of the load detector 100 above a lower part of the two divided parts and placing an upper part of the two divided parts on the corresponding mounting plate 3. In the present description, the phrase "disposing a load detector in a leg of a bed" includes a case in which the casters CT are disposed on the load detectors, a case in which the legs of the bed BD are disposed directly on the load detectors, and a case in which each load detector is disposed between the upper part and the lower part of the bed leg formed of two divided parts.

In the load detection system related to the second embodiment, the output from each load detector 100 may be transmitted to the controller CONT wirelessly rather than the wiring. The controller CONT may be connected to an indicator indicating the load determined by the controller CONT and an alarm giving a predetermined alarm based on the determined load.

The present disclosure is not limited to the above embodiments and its modified examples provided that the characteristics of the present disclosure can be obtained. The present disclosure includes any other embodiments which can be conceived in the range of the technical ideas of the present disclosure.

In the load detector related to the above embodiments, the mounting part is disposed between the first beam type load cell and the second beam type load cell facing each other, and the mounting plate is supported at two points by the free end side of the first beam type load cell and the free end side of the second beam type load cell, which is positioned on an opposite side of the free end of the first beam type load cell in the longitudinal direction of the first beam type load cell. Thus, in the load detector related to the above embodiments, placing the object to be detected (detection target) on a straight line connecting the two supported points result in good load detection while reducing the influence of bending of the mounting part.

In the load detector related to the above embodiments, the first beam type load cell may be disposed parallel to the second beam type load cell. Further, in the load detector related to the above embodiments, the position of the free end of the first beam type load cell may be substantially identical to a position of the second support base in the extending direction of the first beam type load cell, and the position of the free end of the second beam type load cell may be substantially identical to a position of the first support base in the extending direction of the first beam type load cell. Disposing the first and second beam type load cells as described above enables a compact load detector and simplifies a calculation process performed after the load detection by the first and second load cells.

In the load detector related to the above embodiments, the first beam type load cell may include a first flexure element, the second beam type load cell may include a second flexure element, and the mounting part may include a flat plate-shaped main body fixed to lower surfaces of the first flexure element and the second flexure element. Fixing the mounting part to lower parts of the load cells reduces the height of the load detector.

In the load detector related to the above embodiments, the first beam type load cell may include a first flexure element, the second beam type load cell may include a second flexure element, and the mounting part may be a bent plate which is fixed to upper surfaces of the first flexure element and the second flexure element. The bent plate may define a U-shaped groove extending substantially parallel to the first beam type load cell between the first beam type load cell and the second beam type load cell. Such a configuration further reduces the bending of the mounting part which would be otherwise caused by the placement of the detection target, and it prevents the contact between the detection target and the load cells.

The load detector related to the above embodiments may be configured to be disposed on a floor so as to detect a load of the object placed on the mounting part based on a movement of the mounting part in an up-down direction. The load detector related to the above embodiments may further include a slope fixed to the mounting part in a manner such that a lower end of the slope is kept separated from the floor in the up-down direction during the movement of the mounting part. The slope allows a rolling body such as a caster to be easily placed on the mounting plate. The slope may be a plurality of slopes provided on both sides in the extending direction of the first beam type load cell.

The load detector related to the above embodiments may further include a slope fixed to at least one of the first support base and the second support base. The mounting part may be movable independently of the slope.

The load detector related to the above embodiments may be configured to be disposed on a floor so as to detect a load of the object placed on the mounting part based on a movement of the mounting part in an up-down direction. A lower end of the slope may contact the floor in a case that the load detector is disposed on the floor.

In the load detector related to the above embodiments, the mounting part may include a movement restriction part in a center of the mounting part. The movement restriction part allows the detection target including the rolling body such as the caster to be successfully held at a desired portion on the mounting part.

In the load detector related to the above embodiments, the first support base may be formed integrally with the second support base.

The load detector related to the above embodiments may be configured to detect a load of a human subject on a bed with casters. The mounting part may be configured to support one of the casters placed on the mounting part.

The load detection system related to the above embodiments can successfully detect the load of the human subject by using the load detector as defined in the first aspect.

The above embodiments provide a load detector which successfully detects a load while reducing the influence of a position deviation error and a load detection system including the load detector.

The load detector and the load detection system related to one aspect of the present disclosure can successfully detect a load while reducing the influence of a position deviation error. Thus, when the load detector and the load detection system related to one aspect of the present disclosure are used in hospitals, nursing homes, and the like, they can detect the load of a human subject on a bed easily and precisely, thereby contributing to improvement of medical treatment quality, nursing quality, and the like.

The invention claimed is:

1. A load detector, comprising:
   a first beam type load cell which is supported on a first support base in a cantilever manner to have a free end;
   a second beam type load cell which is disposed to face the first beam type load cell and which is supported on a second support base in a cantilever manner to have a free end; and
   a mounting part on which an object is to be placed, which includes a first connection part connected to the first beam type load cell and a second connection part connected to the second beam type load cell, and which is disposed between the first beam type load cell and the second beam type load cell,
   wherein the free end of the first beam type load cell and the free end of the second beam type load cell face opposite directions to each other in an extending direction of the first beam type load cell, and
   the first connection part of the mounting part is connected to the first beam type load cell on a side of the free end of the first beam type load cell and the second connection part of the mounting part is connected to the second beam type load cell on a side of the free end of the second beam type load cell.

2. The load detector according to claim 1, wherein the first beam type load cell is disposed parallel to the second beam type load cell.

3. The load detector according to claim 2, wherein the position of the free end of the first beam type load cell is substantially identical to a position of the second support base in the extending direction of the first beam type load cell, and the position of the free end of the second beam type load cell is substantially identical to a position of the first support base in the extending direction of the first beam type load cell.

4. The load detector according to claim 1, wherein the first beam type load cell includes a first flexure element,
   the second beam type load cell includes a second flexure element, and
   the mounting part includes a flat plate-shaped main body fixed to lower surfaces of the first flexure element and the second flexure element.

5. The load detector according to claim 1, wherein the first beam type load cell includes a first flexure element,
   the second beam type load cell includes a second flexure element, and
   the mounting part is a bent plate which is fixed to upper surfaces of the first flexure element and the second flexure element and which defines a U-shaped groove extending substantially parallel to the first beam type load cell between the first beam type load cell and the second beam type load cell.

6. The load detector according to claim 1, wherein the load detector is configured to be disposed on a floor so as to detect a load of the object placed on the mounting part based on a movement of the mounting part in an up-down direction, and
   the load detector further comprises a slope fixed to the mounting part in a manner such that a lower end of the slope is kept separated from the floor in the up-down direction during the movement of the mounting part.

7. The load detector according to claim 6, wherein the slope is one of a plurality of slopes provided on both sides in the extending direction of the first beam type load cell.

8. The load detector according to claim 1, further comprising a slope fixed to at least one of the first support base and the second support base, wherein the mounting part is movable independently of the slope.

9. The load detector according to claim 8, wherein the load detector is configured to be disposed on a floor so as to detect a load of the object placed on the mounting part based on a movement of the mounting part in an up-down direction, and a lower end of the slope contacts the floor in a case that the load detector is disposed on the floor.

10. The load detector according to claim 1, wherein the mounting part includes a movement restriction part in a center of the mounting part.

11. The load detector according to claim 1, wherein the first support base is formed integrally with the second support base.

12. The load detector according to claim 1, wherein the load detector is configured to detect a load of a human subject on a bed with casters, and the mounting part is configured to support one of the casters placed on the mounting part.

13. A load detection system configured to detect a load of a human subject on a bed, the system comprising:

a plurality of load detectors each of which is the load detector as defined in claim 1, each of the plurality of load detectors being disposed in each of the legs of the bed; and a controller connected to the plurality of load detectors and configured to calculate the load of the human subject based on outputs of the plurality of load detectors.

* * * * *